Oct. 1, 1957  H. A. SCHEEL ET AL  2,808,056
ROTARY CONVEX HULLER FOR EASILY DAMAGED CROPS
Filed July 13, 1953  2 Sheets-Sheet 1

INVENTORS
Harvey A. Scheel
Christian L. Martin, Jr.
BY Mason, Porter, Diller +
Stewart
ATTORNEYS

United States Patent Office 2,808,056
Patented Oct. 1, 1957

2,808,056

ROTARY CONVEX HULLER FOR EASILY DAMAGED CROPS

Harvey A. Scheel and Christian L. Martin, Jr., Le Sueur, Minn., assignors to Green Giant Company, Le Sueur, Minn., a corporation of Minnesota Application July 13, 1953, Serial No. 367,442

8 Claims. (Cl. 130—30)

The invention described in detail in the following specification relates to the harvesting and threshing of legumes and small grains. Such material must be quickly harvested from the field in which it is grown, and the peas, beans or like berries and grain or seeds promptly removed from the vines or other plants. In the case of green peas, the material is relatively tender and susceptible of damage if the threshing operation is too severe or prolonged unduly. In many instances the permissible speed is limited by rapid increase in damage and loss of the material. It is also difficult to effectually separate the materials from an abnormal volume of vines.

By utilizing a new and improved method of handling the crop, we have been able to accomplish uniform, efficient results independent of variations in the condition of the crop and the speed with which it is harvested.

Specifically, we give the advancing vines or straw containing the legumes, seeds, and the like, one or more light threshing blows during a relatively short or momentary period. This is accomplished by providing an advancing convex abutment against which the pods or seed heads are driven. Clearance between the convex abutment and the beater is relatively close depending upon the specific material being treated. The essential feature is that the beater shall drive the pods or seed heads against the convex abutment one or more times, but only for an instant following which the surfaces of the beater and abutment separate to allow free discharge of the separated peas or like material.

Numerous operating advantages are found in the mechanism provided to accomplish the above results.

One of the objects of our invention is to provide an efficient machine which will operate without the necessity of being maintained horizontally or level.

Another object of our invention is to provide a threshing operation which will be proof against choking of material even though an abnormal volume is being fed.

A still further object of the invention is to provide a threshing action effective regardless of the degree of moisture present in the crop. Thus a damp, succulent material can be harvested without and more damage than is the case with straw material. Limp, tough, wilted material will advance through the machine at virtually the same rate as is the case with green, succulent material or straw.

Among the objects of our invention is to provide for controlling the completeness of threshing by variation in the speed of the machine.

Related to the above, it is also a purpose of the invention to permit an increase of speed, without however, making a corresponding increase in damage to the crop.

Thus the speed of threshing can be adjusted to the desired rate of travel of the vehicle carrying the threshing mechanism.

Incidentally it has been found that the length of the beater and abutment rolls can be increased to give greater capacity without decreasing the efficiency.

As illustrating the invention above described, we have shown the preferred form of the invention on the accompanying drawings in which Fig. 1 is a side elevation of the improved threshing machine for podded and seed crops;

Figure 1:
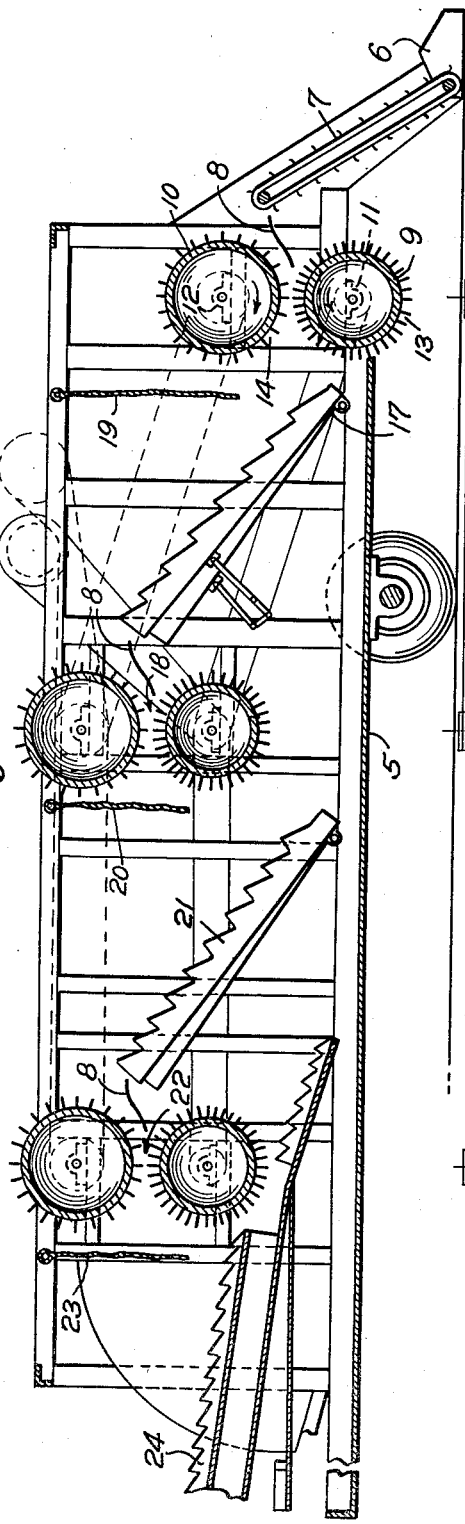
Figure 2:
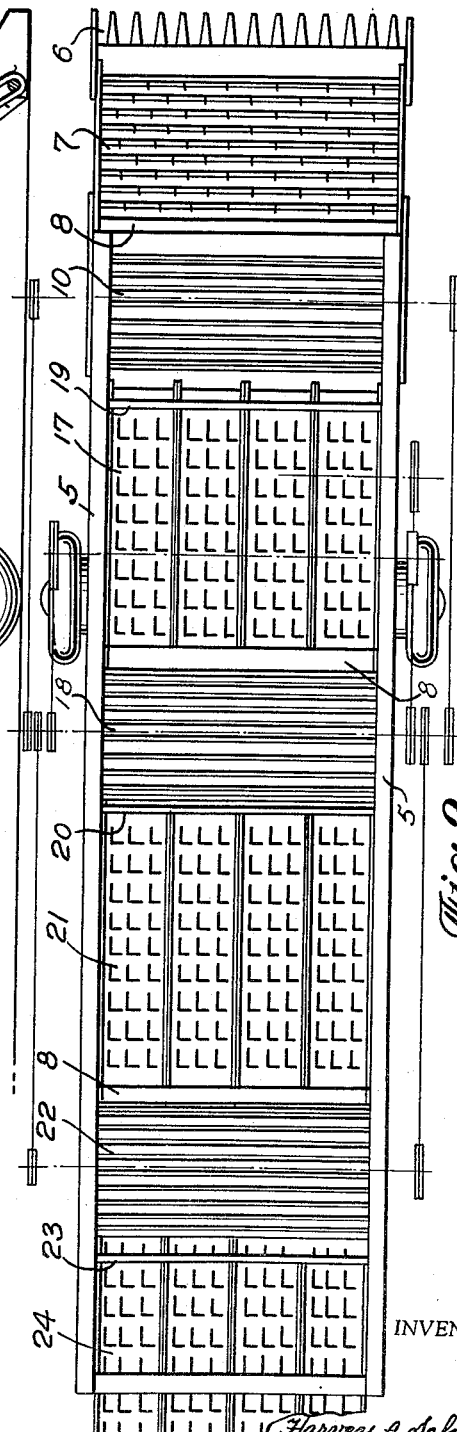
Fig. 2 is a plan view of the same.

The essential feature of the novel principle and improved mechanism is the provision of a momentary threshing effect by which the material is thrown against an advancing convex abutment which movement may be repeated several times followed by the immediate escape of the threshed berries or seeds from further impingement on the abutment. This effect is produced by passing the material being treated through several successive stages of treatment, between each of which the loose berries or seeds are removed from the path of action.

In the drawings, the novel threshing mechanism is mounted upon a wheeled vehicle 5. This is adapted to be driven by a tractor through a standing crop which is ready for harvesting.

Suitable cutters or pullers 6 are provided for gathering the standing vines or stalks. These are then advanced over an endless belt conveyor 7 to a feed plate 8. This feed plate has a wide throat receiving the vines and stalks and allowing them to pass down into the threshing unit.

The threshing is accomplished by providing a pair of opposed drums 9 and 10. The lower drum 9 is journaled on the vehicle as shown at 11. It is driven by suitable mechanism in a direction away from the feed plate or counterclockwise as shown in Fig. 1.

The upper drum 10 is journaled as shown at 12, above the lower drum 9. The upper drum rotates in a direction opposite the lower drum 9 or in a clockwise direction as shown at Fig. 1.

The upper drum is driven at a peripheral speed greater than that of the lower drum 9. Ordinarily the drums will have the same diameter.

Each drum is provided with a series of radially extending blades. Drum 9 is provided with equally spaced blades 13, while corresponding blades 14 are mounted upon the upper drum 10. The blades on the lower drum are primarily abutments against which the material is thrown by the blades on the upper drum.

The blades on the upper drum being spaced farther apart will strike the vines or straw and the attached pods or seed heads with lateral blows, thus projecting the latter against the blades of the lower drum.

Due to the relatively more rapid speed of the upper drum, fewer blades are required. For example, if the upper drum rotates twice as fast as the lower one, one-half as many blades on the upper drum will be sufficient to cause interaction between successive blades on the two drums.

The drums may for example be approximately 24 inches diameter and 32 inches long. The number of blades on the lower drum may vary from 16 to 75, and have a depth of approximately 5 inches.

The blades on the upper drum are substantially the same in depth but less in number.

The blades on the two drums are brought close to each other during rotation and the clearance is substantially $3/16$ to $5/8$ of an inch, depending upon the nature of the material being separated.

An important feature of the improved arrangement is the shape and position of the feed plate 8. This has a wide opening 15 leading to an extended throat 16 concentric with the upper drum 10 and slightly spaced from the blades 14. By arranging the end of the throat spaced away from the lower drum 9 at an angle $a$ as shown, the material picked up by the blades 14 is given a tangential direction causing the pods or seed heads to be thrown against the blades 13 of the lower drum in advance of the point of minimum approach, or common tangency.

As the drums rotate, successive blades 14 will advance the material into the minimum space between the drums and ultimately provide a rubbing or abrading action at this point. This may also be accompanied by a slight crushing operation where the pods are wider than the clearance and the blades coincide in their approach.

As soon as the peas, seeds or other material are separated from the pods or straw, they fall into the pockets between adjacent blades 13. They are thus shielded from further impact by the blades 14 on the upper drum. They are protected and carried around between the blades to the point where they are thrown out tangentially as shown by the lower arrow on Fig. 3.

Any peas or the like which are not thrown out will be dropped out as the drum rotates farther.

Figure 3:
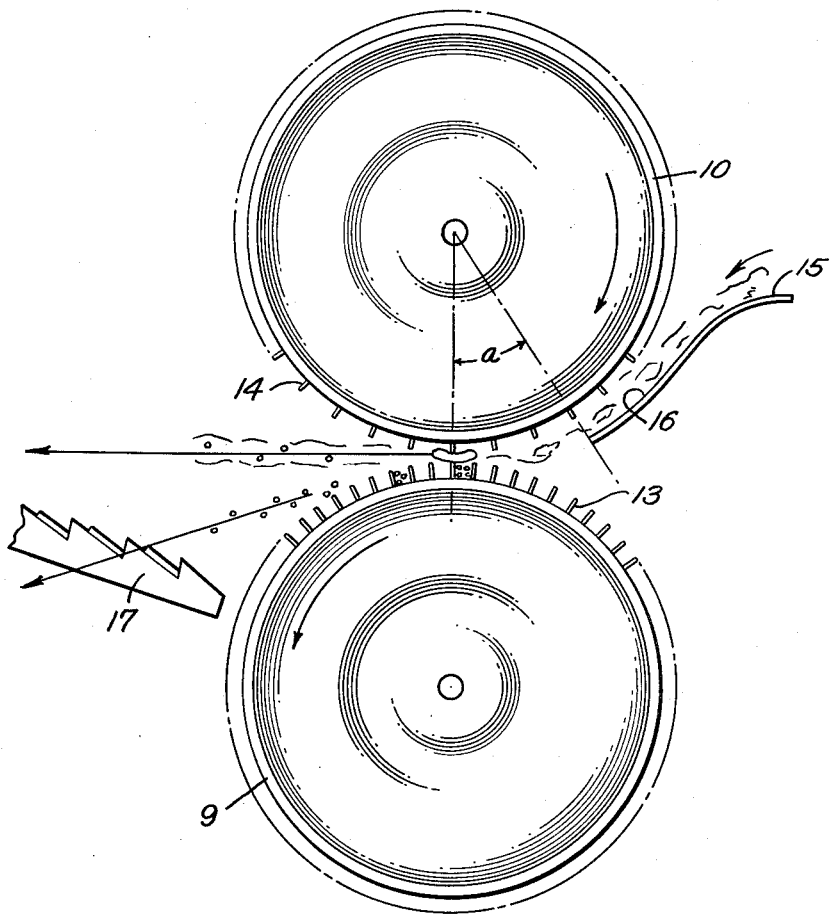
Fig. 3 is a fragmentary side elevation of one threshing unit showing the travel of the material as it is being threshed.

The broken pods or straw passing through the clearance between the drums will be driven by impact horizontally as shown by the upper arrow in Fig. 3.

Any loose berries, seeds or the like will be caught in a pan or separator not shown and will be further treated.

The straw, vines or other material which still has some of the unseparated pods and the like, will be picked up by a straw rack 17 of the usual type. This will advance the material up to a second pair 18 of separating drums where the hulling or threshing operation is repeated.

A curtain 19 has been hung beyond the upper drum 10 in order to prevent trash or seeds being scattered on discharge from the first pair of drums.

A similar curtain 20 is provided beyond the second pair 18 of separating drums.

The separation may be continued for one or more additional stages. We have illustrated a second rack 21 leading to a third pair of separating drums 22. The separating drums 22 are followed by a third curtain 23 and a discharge conveyor 24 for the trash from which the desired berries, peas, seeds or the like have been completely separated.

We have used the term "rotating in the same peripheral direction" as descriptive of the movement of the drums by which their peripheries at the common tangent will be in the same direction. The axes on which they rotate will be moving in opposite directions, namely, one clockwise and the other counter-clockwise, as indicated on the drawing, Fig. 3.

The vines or stalks carrying the crop to be hulled, are fed between a pair of drums operating in this fashion. Due to the nature of the engagement of the drum blades, the drums may be of any desired length determined by the swath to be harvested. The action of the drums is not affected by increase in their length.

The spacing of the drums is subject to adjustment. The clearance at the point of tangency is greater than the individual peas or like seeds or grains. However, it is less than the normal width of the pods or seed cases of similar material being harvested. There is first a beating action when the pods or seed cases are engaged by the blades on the upper drum and thrown against the lower drum. This may serve to break the pod or seed case and release the peas or like material. Such material will fall into the space on the lower drum between adjacent blades and thus be out of contact with subsequent blades on the upper drum.

The pods in the process of being opened may rebound from the lower drum and be struck one or more additional times by the rapidly rotating blades of the upper drum. This continues the hulling operation.

Finally, the hulls or other seed cases must pass through the space between the blades at their nearest approach (common tangent). Further hulling is accomplished at this point.

Where a pass through a single pair of drums leaves a portion of the material unhulled, it may then be passed through additional pairs of drums. Three passes have been found sufficient to hull over 96% of the crop.

Due to the action of the blades and the clearance provided, damage to the individual peas or similar crop is held to a minimum. It is worthy of note that the extent of damage, such as cutting or bruising, does not increase in proportion to an increase in peripheral speed of the drums.

The ratio of speed between the upper and lower drums of a pair is also subject to wide variation dependent upon the nature of the crop and its physical condition, that is, whether brittle or limp, dry or wet.

Regardless of whether the peas or other seeds are thrown out tangentially by the action of the drums or conveyed out of the area of hulling in the pockets of the lower drum, they fall into a pan, screen or the like at the bottom of the machine where they are subject to screening or other form of cleaning and separation.

From the action above described it will be apparent that the hulling operation is carried out without dependence upon maintaining the hulling equipment on a level or horizontal plane. Variation in slope along either the longitudinal or transverse axis does not affect the rate of throughput.

Again, the action of the machine is not affected by overload, and it does not become choked by excess of feed.

The machine is adapted for the treatment of material whether it be strawy or green and succulent. Dry, tough material passes through at virtually the same rate as limp, wilted material will.

Furthermore, there is a minimum of damage to the crop, and this is not increased proportionally with increase in speed of operation.

Any desired ground speed of the machine may therefore be obtained without affecting the hulling characteristics or the extent of damage.

While the preferred form of the invention has been described above and illustrated for the purpose of example, the invention may be carried out in different ways and by machines of varied proportions, material and operating characteristics without departing from the scope of the invention as defined in the following claims.

What we claim is:

1. A combined threshing and hulling machine for green peas and the like, comprising a lower drum and an upper drum having parallel axes, a series of longitudinal radial blades on each drum, the blades of one drum being separated from those on the other drum at their common tangent by a distance less than the thickness of the pods or seed cases, and means for rotating said drums in the same peripheral direction at different speeds.

2. A combined threshing and hulling machine for green peas and the like comprising a lower drum and an upper drum having parallel axes, a series of longitudinal radial blades on each drum, the blades of one drum being separated from those on the other drum at their common tangent by a distance less than the thickness of the pods or seed cases, and means for rotating said drums in the same peripheral direction with the upper drum rotating faster than the lower drum.

3. A combined threshing and hulling machine for green peas and the like comprising a lower drum and an upper drum having parallel axes, a series of spaced longitudinal radial blades on the lower drum, a series of longitudinal radial blades on the upper drum spaced farther apart than those on the lower drum, the blades of one drum being separated from those on the other drum at their common tangent, and means for rotating said drums in the same peripheral direction at different speeds.

4. A combined threshing and hulling machine for green peas and the like comprising a lower drum and an upper drum having parallel axes, a series of spaced longitudinal radial blades on the lower drum, a series of longitudinal radial blades on the upper drum spaced farther apart than those on the lower drum, the blades of one drum being separated from those on the other drum at their common tangent, and means for rotating said drums in the same peripheral direction with the upper drum rotating more feet per minute than the lower drum.

5. A combined threshing and hulling machine for green peas and the like comprising a lower drum and an upper drum having parallel axes, a series of spaced longitudinal radial blades on each drum, the blades of one drum being separated from those on the other drum at their common tangent, a feed chute for the upper drum terminating above the point of common tangency, and means for rotating the said drums in the same peripheral direction.

6. A combined threshing and hulling machine for green peas and the like comprising a lower drum and an upper drum having parallel axes, a series of spaced longitudinal radial blades on each drum, the blades of one drum being separated from those on the other drum at their common tangent, a feed chute for the upper drum terminating above the point of common tangency, and means for rotating the said drums in the same peripheral direction, with the upper drum rotating more feet per minute than the lower drum.

7. A combined threshing and hulling machine for green peas and the like comprising a lower drum and an upper drum having parallel axes, a series of spaced longitudinal radial blades on the lower drum, a series of longitudinal radial blades on the upper drum spaced farther apart than those on the lower drum, the blades of one drum being separated from those on the other drum at their common tangent, a feed chute for the upper drum terminating above the point of common tangency, and means for rotating said drums in the same peripheral direction at different speeds.

8. In combination a series of successively operating threshing and hulling machines for green peas and the like, each comprising a lower drum and an upper drum having parallel axes, a series of longitudinal radial blades on each drum, the blades of one drum being separated from those on the other drum at their common tangent, and means for rotating said drums in the same peripheral direction at different speeds and material feeding means leading to each machine from the preceding machine.

References Cited in the file of this patent

UNITED STATES PATENTS

| | | |
|---|---|---|
| 680,755 | Bloom | Aug. 20, 1901 |
| 1,419,072 | Morelock | June 6, 1922 |
| 1,906,598 | Hoe | May 2, 1933 |
| 2,183,769 | Hawkins | Dec. 19, 1939 |
| 2,414,855 | Cornell | Jan. 28, 1947 |
| 2,458,345 | Cass | Jan. 4, 1949 |